(12) United States Patent
Shimokawa (10) Patent No.: US 7,498,553 B2
(45) Date of Patent: Mar. 3, 2009

(54) IMAGE READING DEVICE

(75) Inventor: Koji Shimokawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/743,235

(22) Filed: May 2, 2007

(65) Prior Publication Data

US 2007/0262233 A1 Nov. 15, 2007

(30) Foreign Application Priority Data

May 9, 2006 (JP) ............................. 2006-129841

(51) Int. Cl.
*G01J 1/32* (2006.01)

(52) U.S. Cl. .................... 250/205; 250/208.1; 347/237; 347/247; 358/509

(58) Field of Classification Search ................ 250/205, 250/208.1, 214.1, 214 R, 214 D, 559.3, 559.07, 250/559.05; 347/237, 247; 362/3, 4, 8, 11, 362/18, 230, 231; 358/509, 512, 518, 468, 358/474, 475, 505.52
See application file for complete search history.

(56) References Cited

U.S. PATENT DOCUMENTS

| | | | |
|---|---|---|---|
| 5,608,547 A | | 3/1997 | Nakatani et al. |
| 7,071,979 B1 * | | 7/2006 | Ohtani et al. ............... 348/269 |
| 2001/0035986 A1 | | 11/2001 | Ikeda |
| 2004/0145301 A1 * | | 7/2004 | Yoshida ...................... 313/498 |

FOREIGN PATENT DOCUMENTS

| | | |
|---|---|---|
| JP | 2002-330266 | 11/2002 |
| JP | 2004-248190 | 9/2004 |

* cited by examiner

*Primary Examiner*—Georgia Y Epps
*Assistant Examiner*—Francis M Legasse, Jr.
(74) *Attorney, Agent, or Firm*—Amin, Turocy & Calvin, LLP (57) ABSTRACT

A technology capable of preventing generation of a problem due to saturation of an output value in an image pick-up section caused by a variation of illumination light from a light source. An image reading device includes a plurality of light sources each of which illuminates a document surface as a target for reading with illuminating light of a color different from the other light sources, an image pick-up section for imaging light radiated from the plurality of the light sources and reflected on the document surface, a controlling unit for making the plurality of the light sources emit light with any one of the plurality of the light sources as a reference light source, and an adjusting unit for lowering a current value of a power source which makes the reference light source emit light when an amount of light imaged in the image pick-up section exceeds a threshold value as a predetermined upper limit value.

4 Claims, 12 Drawing Sheets

IMAGE READING DEVICE

BACKGROUND OF THE INVENTION

1. Field of the Invention

The present invention relates to an image reading device, and a technique of preventing saturation of an output value of an image pick-up section in a case of imaging light radiated by a light source and reflected from a document surface.

2. Description of the Related Art

An image reading device using three colors of LEDs, a red LED, a blue LED, and green LED, for a light source as a means for illuminating a document is conventionally known. In the image reading device of a configuration such as above, as a means for controlling a light amount of each of the red LED, the blue LED, and the green LED, a technique of having any one of the LEDs of the red LED, the blue LED, and the green LED as a reference light source, and controlling the light amount of the other two LEDs with the light amount of the reference light source as a reference, is known.

However, an LED has many variations in a light amount as compared with other light sources such as a xenon lamp. In a case of the conventional image reading device described above, when there is a variation in the light amount of the reference LED (reference light amount) among the red LED, the blue LED, and the green LED, a light amount as an entire light source is significantly different between the reference LED having a maximum reference light amount and the reference LED having a minimum reference light amount. For example, in a case of the reference LED having the maximum reference light amount, a range of an amount of light which can be detected in an image pick-up section (for example, a CCD) is exceeded, and this causes a problem that an output value in the image pick-up section is saturated (data of the amount exceeding the range is lost).

SUMMARY OF THE INVENTION

An object of an embodiment of the present invention is to provide a technique capable of preventing generation of the problem due to saturation of an output value in the image pick-up section caused by a variation of light illuminated from a light source.

In order to achieve the above object, according to an aspect of the present invention, there is provided an image reading device comprising: a plurality of light sources each of which illuminates a document surface as a target for reading with illuminating light of a color different from the other light sources; an image pick-up section that images light radiated from the plurality of the light sources and reflected on the document surface; a controlling unit that makes the plurality of the light sources emit light with any one of the plurality of the light sources as a reference light source so that light amounts of the light sources other than the reference light source are in a predetermined ratio with respect to a light amount of the reference light source; and an adjusting unit that lowers a current value of a power source which makes the reference light source emit light when an amount of light imaged in the image pick-up section exceeds a threshold value as a predetermined upper limit value at the time only the reference light source illuminates a predetermined reference surface, so that the amount of light imaged in the image pick-up section is equal to or smaller than the threshold value.

In addition, according to an aspect of the present invention, there is provided an image reading device comprising: a plurality of light sources each of which illuminates a document surface as a target for reading with illuminating light of a color different from the other light sources; an image pick-up section that images light radiated from the plurality of the light sources and reflected on the document surface; a controlling unit that makes the plurality of the light sources emit light with any one of the plurality of the light sources as a reference light source so that light amounts of the light sources other than the reference light source are in a predetermined ratio with respect to a light amount of the reference light source; and an adjusting unit that raises light receiving sensitivity of the image pick-up section when an amount of light imaged in the image pick-up section is lower than a threshold value as a predetermined lower limit value at the time only the reference light source illuminates a predetermined reference surface, so that the amount of light imaged in the image pick-up section is equal to or larger than the threshold value.

In addition, according to an aspect of the present invention, there is provided an image processing apparatus comprising an image reading device of a configuration as described above and an image forming unit that forms an image on a sheet of paper based on image data of the document read by the image reading device.

In addition, according to an aspect of the present invention, there is provided an image reading method in an image reading device that images light radiated from a plurality of light sources, each of which is illuminating light of a color different from the other light sources, and reflected on a document surface as a target for reading, comprising: lowering a current value of a power source which makes the reference light source emit light when an amount of light imaged in the image pick-up section exceeds a threshold value as a predetermined upper limit value at the time any one of the plurality of the light sources works as a reference light source and only the reference light source illuminates a predetermined reference surface, so that the amount of light imaged in the image pick-up section is equal to or smaller than the threshold value; and controlling light emission of the plurality of the light sources so that light amounts of the light sources other than the reference light source are in a predetermined ratio with respect to the light amount of the reference light source.

In addition, according to an aspect of the present invention, there is provided an image reading method in an image reading device that images light radiated from a plurality of light sources, each of which is illuminating light of a color different from the other light sources, and reflected on a document surface as a target for reading, comprising: raising light receiving sensitivity at the time of imaging in the image reading device with any one of the plurality of the light sources as a reference light source when an amount of light imaged in the image pick-up section is lower than a threshold value as a predetermined lower limit value at the time only the reference light source illuminates a predetermined reference surface, so that the amount of light imaged is equal to or larger than the threshold value; and controlling light emission of the plurality of the light sources so that light amounts of the light sources other than the reference light source are in a predetermined ratio with respect to the light amount of the reference light source.

In addition, according to an aspect of the present invention, there is provided an image reading device comprising: a plurality of light sources each of which illuminates a document surface as a target for reading with illuminating light of a color different from the other light sources; an imaging means for imaging light radiated from the plurality of the light sources and reflected on the document surface; a controlling means for making the plurality of the light sources emit light with any one of the plurality of the light sources as a reference light source so that light amounts of the light sources other than the reference light source are in a predetermined ratio with respect to a light amount of the reference light source; and an adjusting means for lowering a current value of a power source which makes the reference light source emit light when an amount of light imaged in the imaging means at the time only the reference light source illuminates a predetermined reference surface exceeds a threshold value as a predetermined upper limit value, so that the amount of light imaged in the imaging means is equal to or smaller than the threshold value.

In addition, according to an aspect of the present invention, there is provided an image reading device comprising: a plurality of light sources each of which illuminates a document surface as a target for reading with illuminating light of a color different from the other light sources; an imaging means for imaging light radiated from the plurality of the light sources and reflected on the document surface; a controlling means for making the plurality of the light sources emit light with any one of the plurality of the light sources as a reference light source so that light amounts of the light sources other than the reference light source are in a predetermined ratio with respect to a light amount of the reference light source; and an adjusting means for raising light receiving sensitivity of the imaging means when an amount of light imaged in the imaging means at the time only the reference light source illuminates a predetermined reference surface is lower than a threshold value as a predetermined lower limit value, so that the amount of light imaged in the imaging means is equal to or larger than the threshold value.

In addition, according to an aspect of the present invention, there is provided an image processing apparatus comprising an image reading device of a configuration as described above and an image forming means for forming an image on a sheet of paper based on image data of the document read by the image reading device.

DETAILED DESCRIPTION OF THE PREFERRED EMBODIMENTS

Hereinafter, an embodiment of the present invention will be described with reference to the accompanying drawings.

Figure 1:
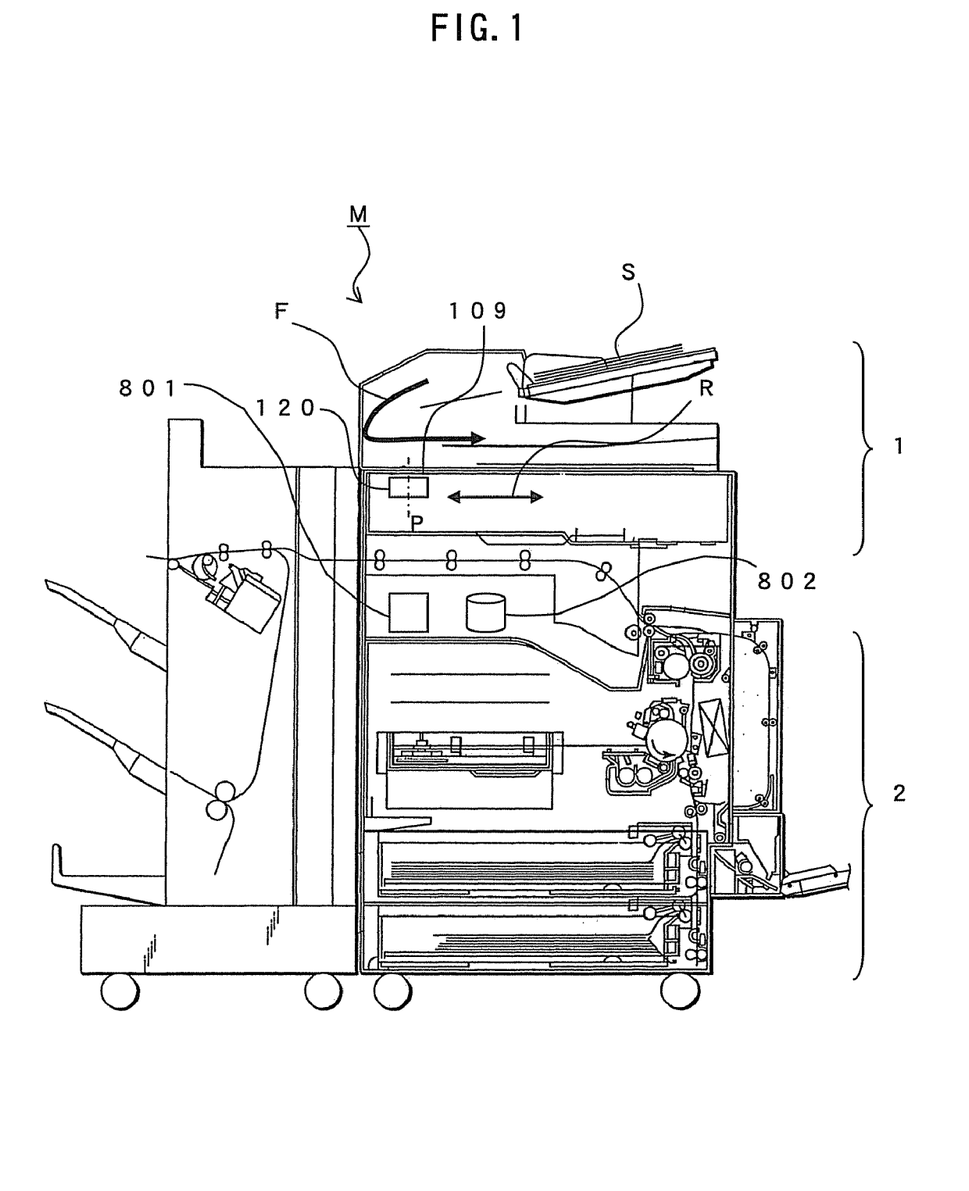
FIG. 1 is an entire configuration diagram for explaining an image reading device according to the present embodiment and an image processing apparatus including the image reading device.

FIG. 1 is an entire configuration view for explaining an image reading device according to the present invention and an image processing apparatus including the image reading device. An image reading device 1 according to the present embodiment is mounted in the image processing apparatus (MFP, Multi Function Peripheral) M as shown in FIG. 1.

The image processing apparatus M shown in FIG. 1 is configured to include the image reading device 1 and an image forming device (image forming unit) 2. The image forming device 2 is capable of carrying out image forming processing (print processing, copy processing, etc.) to a sheet of paper based on image data received by an external equipment and image data read from a document by the image reading device 1.

The image reading device 1 is capable of manual reading in which an image of a document placed on a document table glass 109 is read by moving a CIS (Contact Image Sensor) 120 including an optical system and an image pick-up section for imaging a light source illuminating the document and reflected light from a document surface illuminated by the light source in a predetermined direction R. The image reading device 1 is also capable of an ADF reading in which the image of the document moving in an F direction (conveyed by an ADF (Auto Document Feeder)) is read by the CIS 120 static at a predetermined position P.

Figure 2:
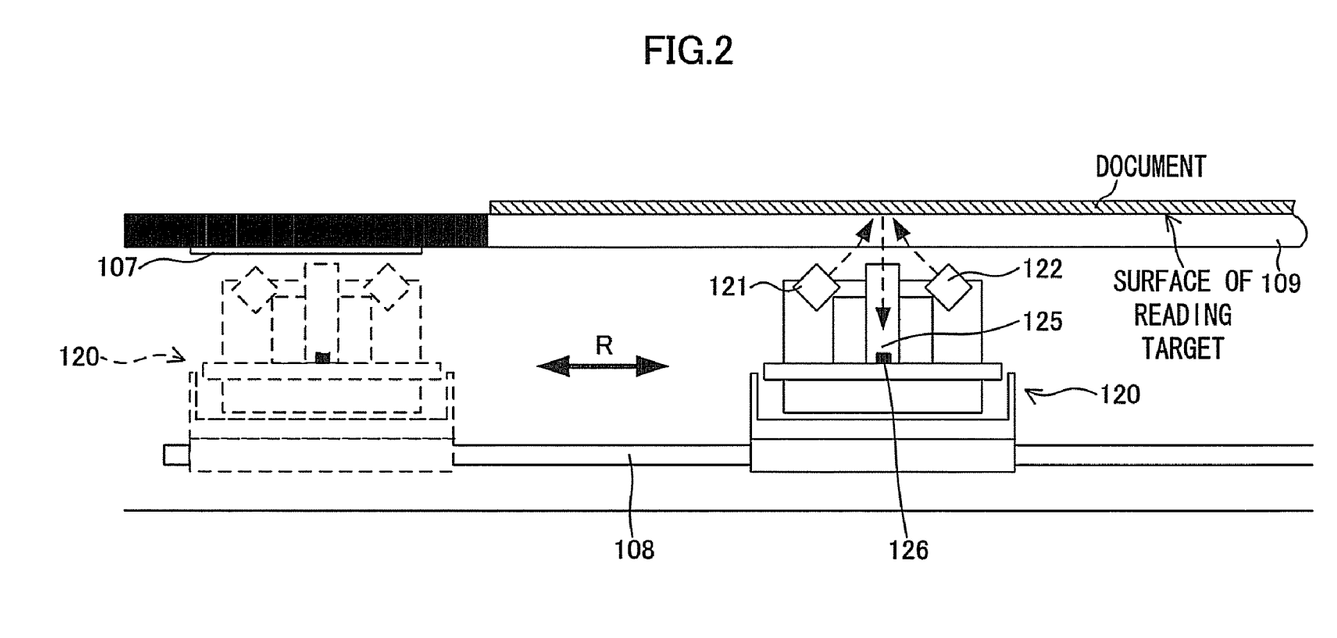
FIG. 2 is a configuration diagram showing a detail of a CIS 120 (carriage) in an image reading device 1 according to the present invention.

FIG. 2 is a configuration view showing a detail of the CIS 120 (carriage) in the image reading device 1 according to the present embodiment. As shown in FIG. 2, the CIS 120 includes a first illumination unit 121, a second illumination unit 122, an optical system 125, and an image pick-up section 126. In addition, the image processing apparatus M includes a CPU 801 and a MEMORY 802 used in the image reading device 1 and the image forming device 2.

The first illumination unit 121 is configured with a light transmission tube of a white type including three LEDs, a red LED, a green LED, and a blue LED, as a light source. The first illumination unit 121 illuminates a document surface from a direction inclining toward the document surface for a predetermined angle.

The second illumination unit 122 is configured with a LED array including a yellow-green LED as a light source and has a spectral characteristic different from the first illumination unit. The second illumination unit 122 illuminates the document surface from a direction substantially symmetrical to the first illumination unit with respect to a normal line to the document surface. As described above, the document surface is illuminated from two positions line symmetrical to each other with illumination light of colors different from each other. Thereby, a read image without a shadow can be obtained regardless of existence of irregularities on the document surface. As described above, a plurality of the light sources in the image reading device according to the present embodiment include at least any of the red LED, the green LED, the blue LED, and the yellow-green LED.

The optical system 125 is configured with a Selfoc lens, etc. The optical system 125 leads light radiated from the first illumination unit 121 and the second illumination unit 122 and reflected by the document surface (refer to an arrow directed in a downward direction in FIG. 2) to a predetermined image formation position. Here, an example where the optical system 125 is entirely arranged on the CIS 120 is shown.

The image pick-up section 126 is configured with a photoelectric conversion element, etc. and images the light led to the predetermined image formation position by the optical system 125. Here, the image pick-up section 126 is assumed to be a CCD. An image of a document imaged by the image pick-up section 126 is stored in the MEMORY 802, and is transmitted to an external equipment which can communicate with the image forming device 2 or the image processing apparatus M as needed. The CIS 120 with a configuration such as above is driven in an R direction by a drive belt 108.

Figure 3:
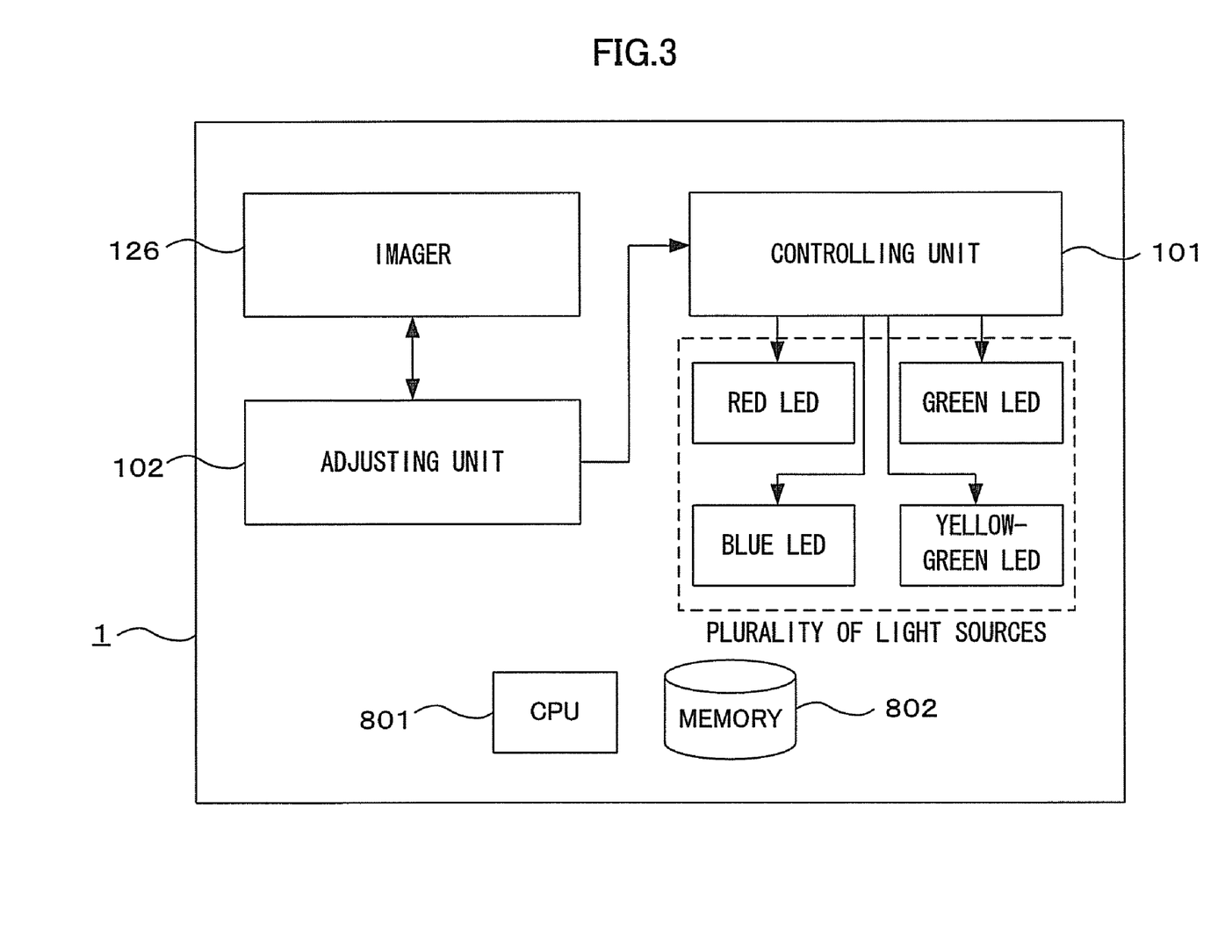
FIG. 3 is a functional block diagram for explaining the image reading device according to the present invention.

FIG. 3 is a functional block diagram for explaining the image reading device according to the present embodiment. As shown in FIG. 3, the image reading device 1 according to the present embodiment is configured to include a plurality of light sources, a controlling unit (controlling means) 101, an adjusting unit (adjusting means) 102, the image pick-up section 126, the CPU 801, and the MEMORY 802.

The controlling unit 101 makes the plurality of the light sources emit light in a manner that, when any one of the plurality of the light sources is a reference light source, light amounts of the light sources other than the reference light source are in a predetermined ratio with respect to a light amount of the reference light source. More specifically, the controlling unit 101 has the light source with the highest output value among the plurality of the light sources constituting the first illumination unit 121 and the second illumination unit 122 (here, the green LED constituting the first illumination unit 121) as the reference light source, and adjusts output values of the other light sources by a D/A converter. Thereby, the controlling unit 101 makes each of the LEDs emit light so that the light amounts of the light sources other than the reference light source (red LED, blue LED, and yellow-green LED) are, for example, in the following ratio with respect to the light amount of the green LED:

amount of light of red LED:amount of light of green LED: amount of light of blue LED:amount of light of yellow-green LED=0.26:1.0:0.22:1.02

The adjusting unit 102 lowers a current value of a power source which makes the reference light source emit light when an amount of light imaged by the image pick-up section 126 exceeds a threshold value as a predetermined upper limit value at the time only the reference light source illuminates a predetermined reference surface (equivalent to a shading correction plate ((white reference plate) shown in FIG. 2), so that the amount of light imaged by the image pick-up section 126 becomes equal to or smaller than the threshold value. More specifically, the adjusting unit 102 adjusts the current value of the power source supplied to the green LED to be, for example, around ½ by using the D/A converter.

On the other hand, the adjusting unit 102 raises light receiving sensitivity of the image pick-up section 126 when the amount of light imaged by the image pick-up section 126 is smaller than a threshold value as a predetermined lower limit value, so that the amount of light imaged by the image pick-up section 126 becomes equal to or larger than the threshold value.

The CPU 801 has a role of carrying out a variety of types of processing in the image reading device 1 and the image processing apparatus M. In addition, the CPU 801 has a role of achieving a variety of functions by executing a program stored in the MEMORY 802. The MEMORY 802 is configured with, for example, a ROM, a RAM, etc., and has a role of storing a variety of types of information and programs used in the image reading device 1 and the image processing apparatus M.

As in the present embodiment, when the LED is used as an illuminating means, a light amount of the LED sometimes changes due to a variation of characteristics between each product and deterioration with age of the LED. The change of the light amount of the LED as described above causes a difference in density of image reading in each image reading device. In order to prevent the problem, the light amount of each of the LEDs is optimized at the time of activation and image adjusting of the image reading device 1 to prevent generation of a difference in density of image reading. FIGS. 4 to 9 are flowcharts showing a flow of processing of optimizing the light amount of each of the LEDs in the image reading device 1 according to the present embodiment.

In the image reading device 1 according to the present embodiment, the light amount of the green LED which is the reference light source is not controlled, and a gain of a CCD output is adjusted based only on the light amount of the reference light source. Thereafter, the light amounts of the red, blue, and yellow-green LEDs are controlled. Details thereof will be described hereinafter.

First, the adjustment of a gain of the CCD output will be described by using FIGS. 4 and 5. At activation of the image reading device, the carriage is moved to a white reference detecting position which is a reference color (S101). In this state, only the reference light source (for example, the green LED) is first lighted (S102) and light in the LEDs other than the green LED is turned off (S103). At this time, peak detection data MaxA to MaxD and a threshold value 6 (corresponding to a threshold value as an upper limit value) are compared (S104 to S108). If the MaxA to MaxD is equal to or larger than the threshold value 6 (S108, Yes), the light amount of the green LED is too large and error occurs, and the user is notified of abnormality in the light source by a service call (S109). If the MaxA to MaxD is smaller than the threshold value 6 (S108, No), peak detection starts (S110). The peak detection is an operation of optimizing the CCD output at the white reference detecting position (position P in FIG. 1). In addition, since the CIS is configured with four channels, the peak detection data MaxA to MaxD is the maximum value of the CCD output of each channel.

After the peak detection starts, a gain of the CCD output is increased until the MaxA to MaxD is equal to or larger than a threshold value 5 (S110 to S117). This operation is repeated, and if the MaxA to MaxD does not become equal to or larger than the threshold value 5 (corresponding to a threshold value as a lower limit value) even when the gain is raised to the maximum value (S114, Yes), the light amount cannot be adjusted. Then, the user is notified of abnormality of the light source by a service call (S119). If the MaxA to MaxD is equal to or larger than the threshold value 5 (S115, No), the gain of the CCD output is considered to have been adjusted, and the control of the light amount of the green LED is terminated. At this time, the maximum value of the gain of a previous processing register is extracted, and a gain adjusted value is written in a register G_LED_MAX_CH (S115, S116).

Figure 6:
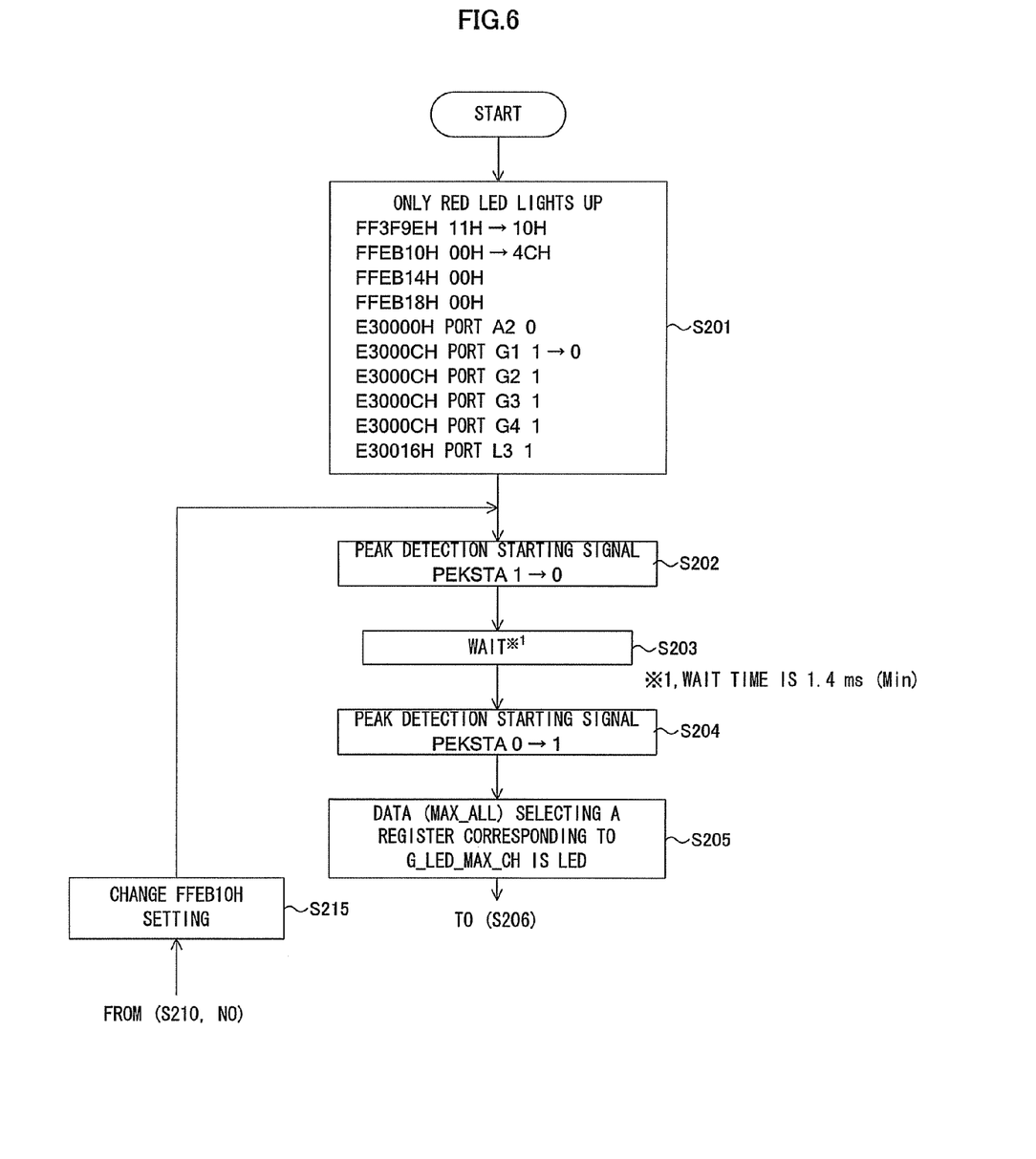
FIG. 6 is a flowchart for explaining control of a light amount of a red LED.
Figure 7:
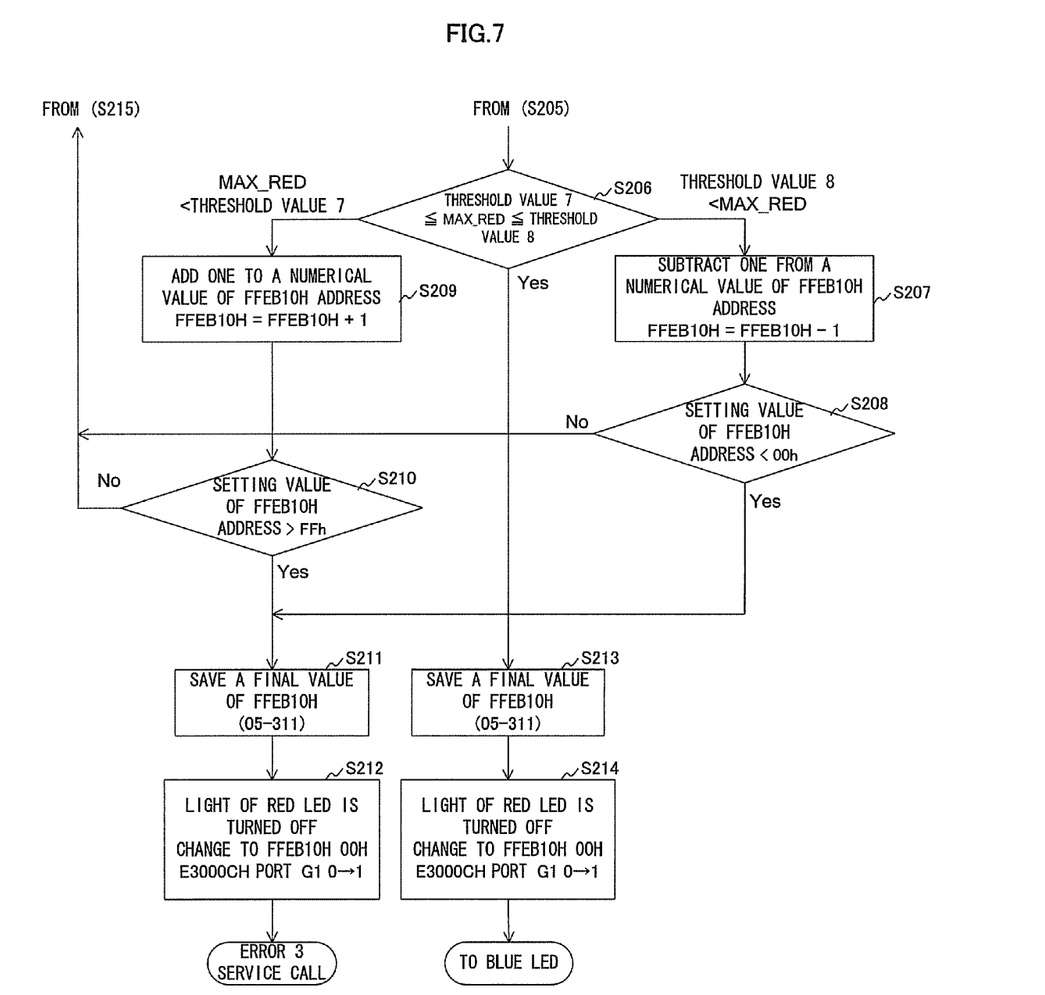
FIG. 7 is a flowchart for explaining control of a light amount of the red LED.

After the adjustment of the gain of the CCD output, control of the light amount of the red LED is carried out as shown in FIGS. 6 and 7. First, only the red LED is lighted (S201), and light in the other LEDs is turned off. In this state, the adjusted value of the gain of the CCD output is read from the register, and the gain is set (S202 to S205). The CCD output at this time and the threshold values 7 and 8 are compared (S206), and if the CCD output is smaller than a threshold 7, a value of FFEB14H which is a setting value of a voltage of the red LED is increased by the D/A converter. Again, comparison between the threshold value 7 and the CCD output is repeated (S209 to S215). If the CCD output does not become equal to or larger than the threshold value 7 even when the operation is repeated until the maximum value of the FFEB14H, the user is notified of abnormality in the light source by a service call (S211, S212). If the CCD output is larger than a threshold value 8, the value of the FFEB14H is lowered in order to lower the CCD output. Again, the comparison between the threshold value 7 and the CCD output is repeated (S207 to S215). If the CCD output does not become equal to or smaller than the threshold value 8 even when the operation is repeated until the minimum value of the FFEB14H, the user is notified of abnormality in the light source by a service call (S211, S212). In this manner, when the CCD output is equal to or larger than the threshold value 7 and equal to or smaller than the threshold value 8, a value of FFEB10H at that time is written in an NVRAM (S213, S214).

Figure 8:
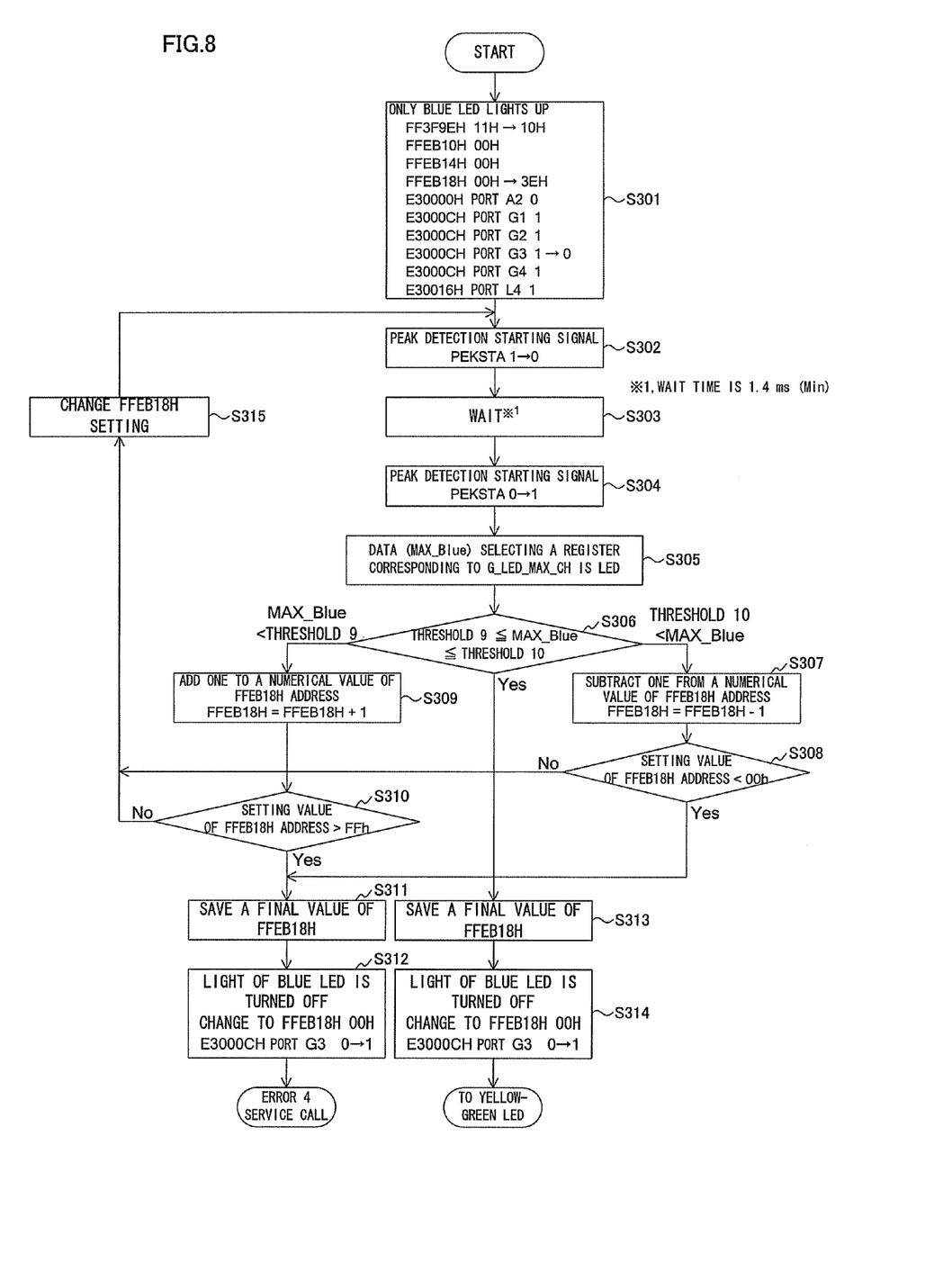
FIG. 8 is a flowchart for explaining control of a light amount of a blue LED.

FIG. 8 is a flowchart for explaining control of a light amount of the blue LED. Since processing in FIG. 8 (S301 to S315) is similar to the content of the processing of the control of the light amount of the red LED (S201 to S215), a detailed explanation thereof is omitted. In the processing shown in FIG. 8, a value of an FFB18H is adjusted so that the CCD output is equal to or larger than a threshold value 9 and equal to or smaller than a threshold value 10. After the adjustment, the value is written in the NVRAM.

Figure 9:
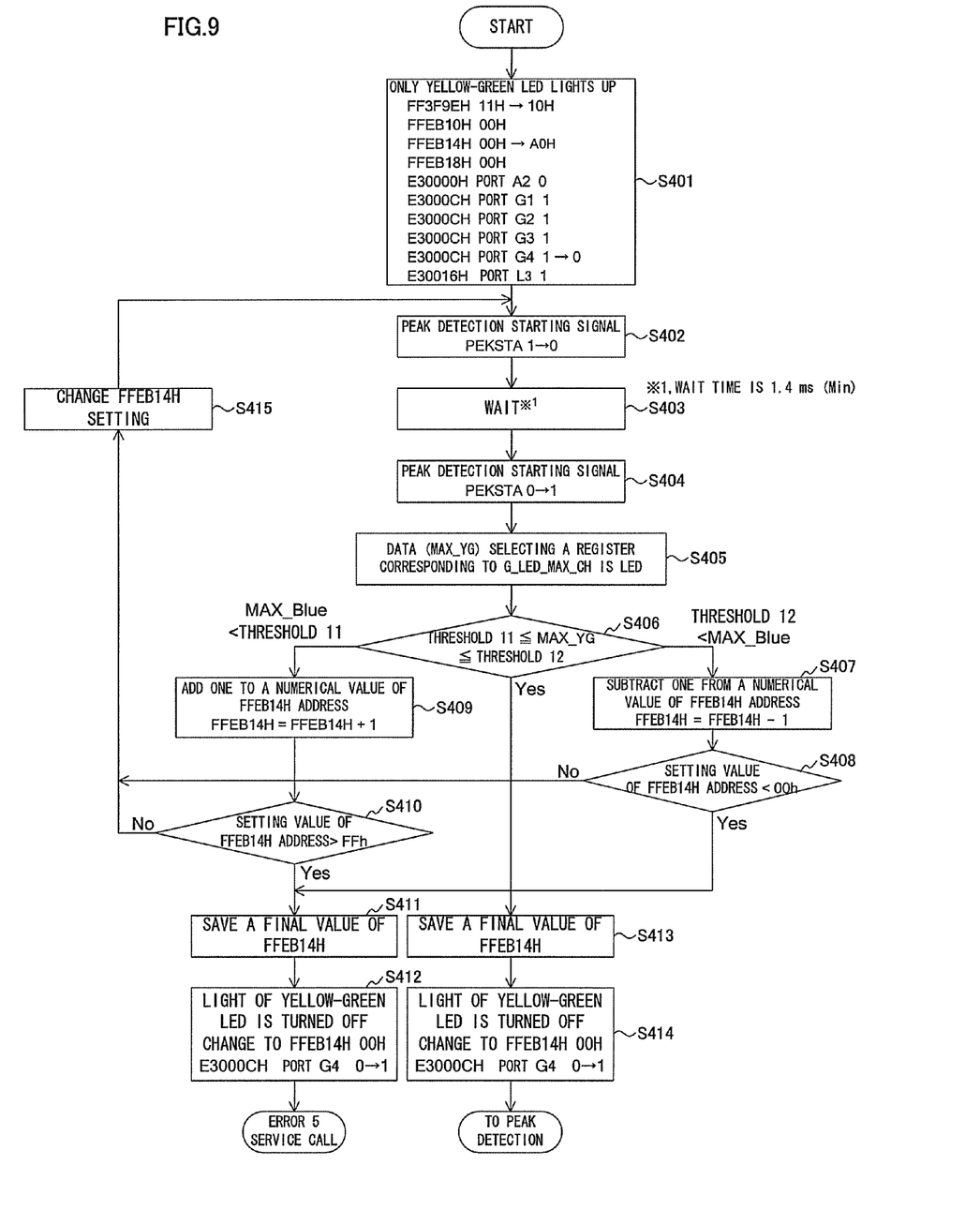
FIG. 9 is a flowchart for explaining control of a light amount of a yellow-green LED.

FIG. 9 is a flowchart for explaining control of a light amount of the yellow-green LED. Since processing in FIG. 9 (S401 to S415) is also similar to the content of the processing of the control of the light amount of the red LED (S201 to S215), a detailed explanation thereof is omitted. In the processing shown in FIG. 9, a value of an FFB14H is adjusted so that the CCD output is equal to or larger than a threshold value 11 and equal to or smaller than a threshold value 12. After the adjustment, the value is written in the NVRAM.

As described above, the light amounts of the red, blue, and yellow-green LEDs are adjusted, and then the peak detection is carried out to adjust a gain of the CCD output.

In the present embodiment, the threshold values 5 to 12 shown in the flowcharts described above are as follows:

threshold value 5-97;
threshold value 6-102;
threshold value 7-24;
threshold value 8-27;
threshold value 9-20;
threshold value 10-23;
threshold value 11-100; and
threshold value 12-105.

In addition, the values of the threshold values 5 to 12 are set so as to have a ratio of the light amounts of the green LED, the red LED, the blue LED, and the yellow-green LED equal to the ratio described above.

By carrying out the control of the light amount as described above, when image reading of a document is carried out by the image reading device 1, the image reading can constantly be carried out with an optimized light amount by reading set values of the light amounts of the red, blue, and yellow-green LEDs written in the NVRAM.

Figure 4:
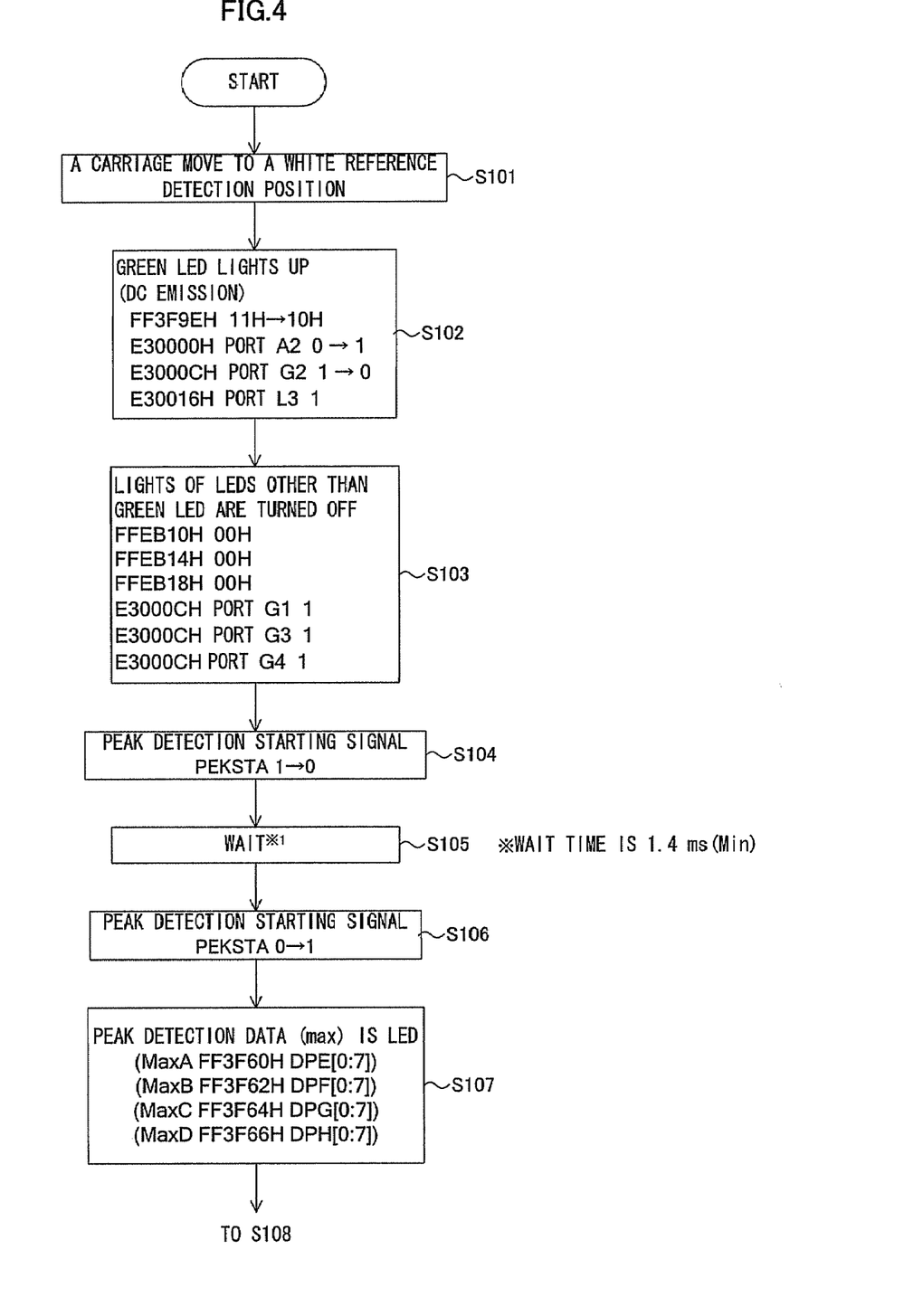
FIG. 4 is a view for explaining adjustment of a gain of a CCD output.
Figure 5:
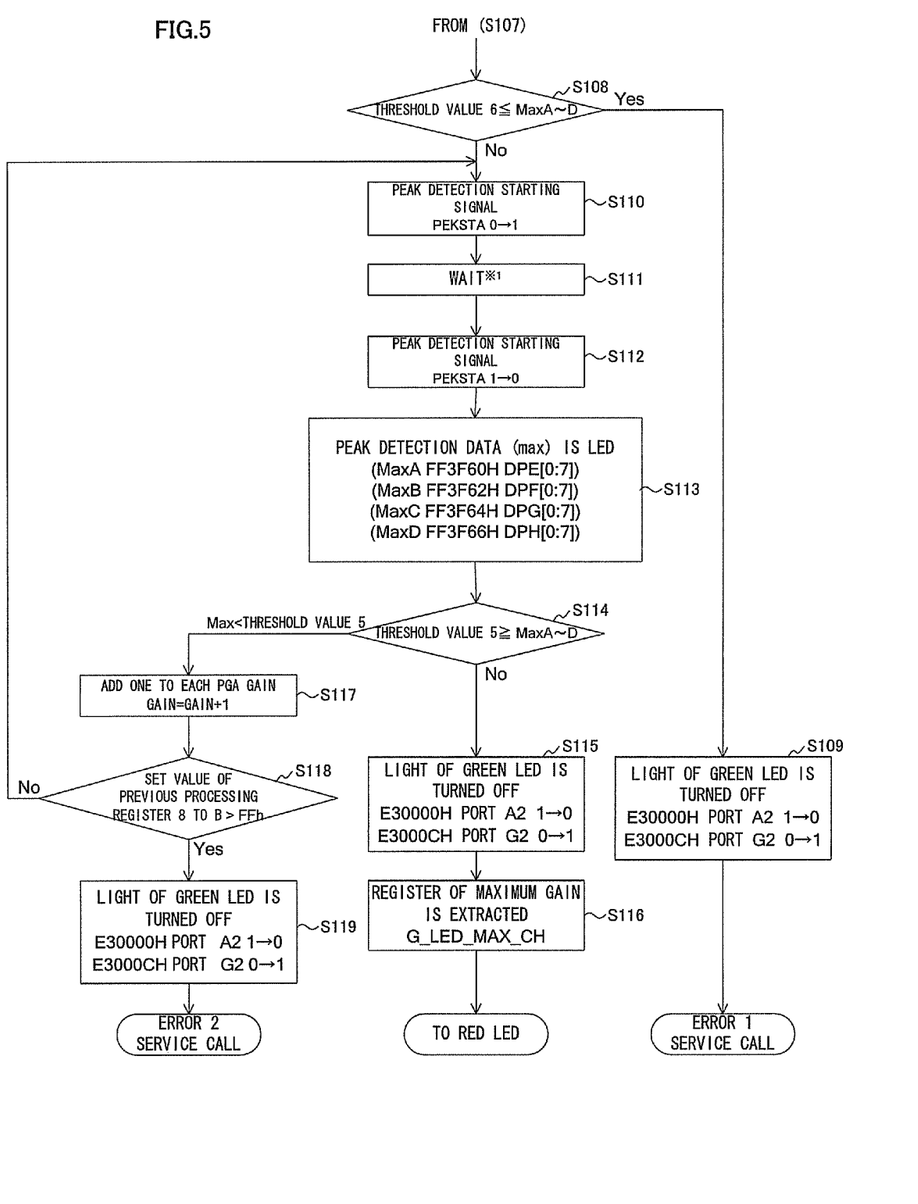
FIG. 5 is a view for explaining the adjustment of a gain of the CCD output.
Figure 10:
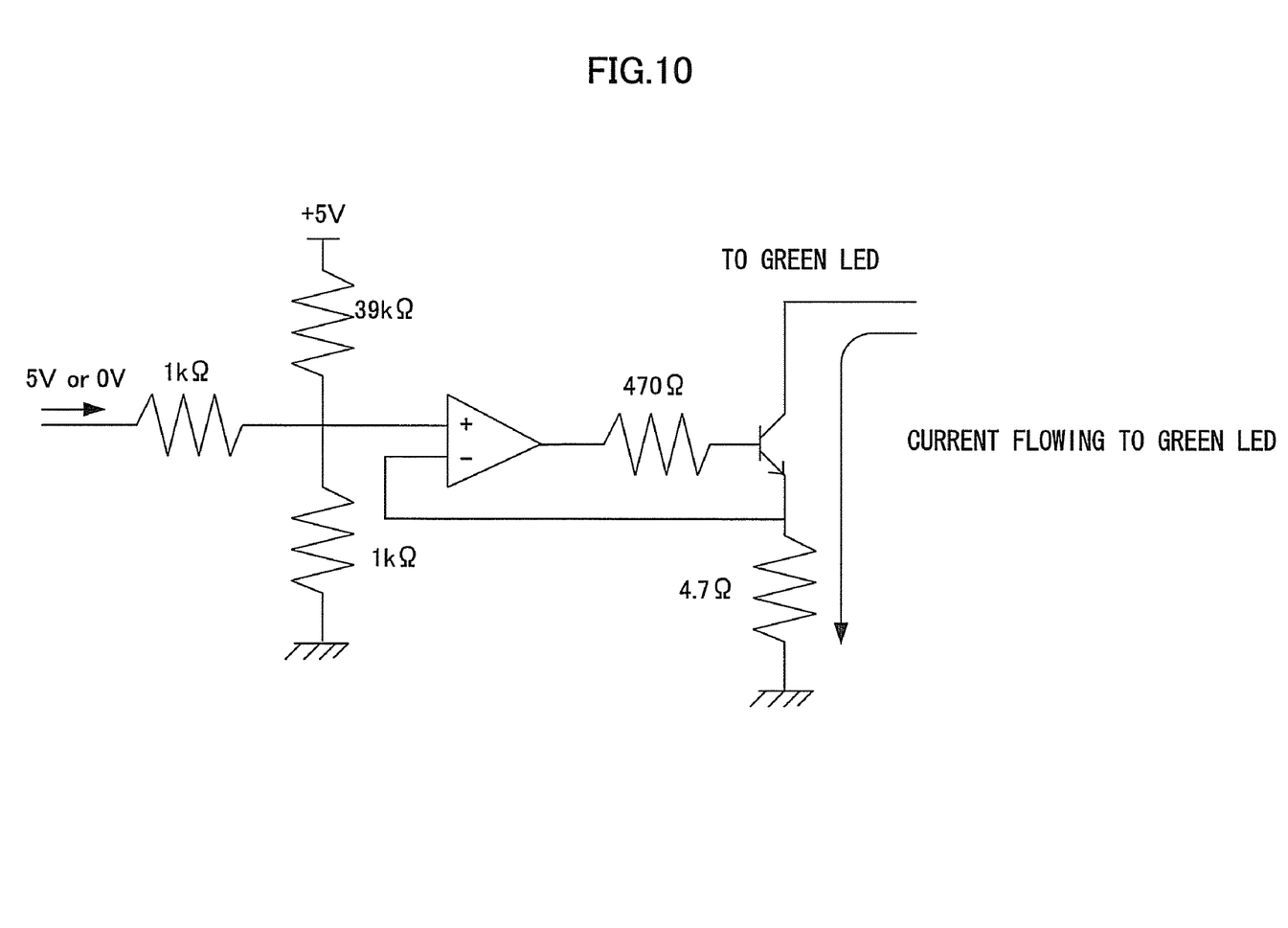
FIG. 10 is a view showing a drive circuit of a green LED.

In a case where there is a variation in the light amount of the green LED which is the reference light source, that is, in a case of an LED where the light amount of the reference light source is a maximum value in a range of a variation, the light amount is equal to or larger than the threshold 6 as shown in FIGS. 4 and 5, and the CCD output is saturated. Therefore, by inputting in a green LED drive circuit shown in FIG. 10 by switching over 5 V and 0 V, current to the green LED can be switched to be multiplied by one or ½. In the flowcharts shown in FIGS. 4 and 5, if the CCD output is equal to or larger than the threshold value 6, by inputting in the above drive circuit by switching 5 V and 0 V, the current to the green LED can be multiplied by ½, and the light amount of the green LED can be reduced to half.

Figure 11:
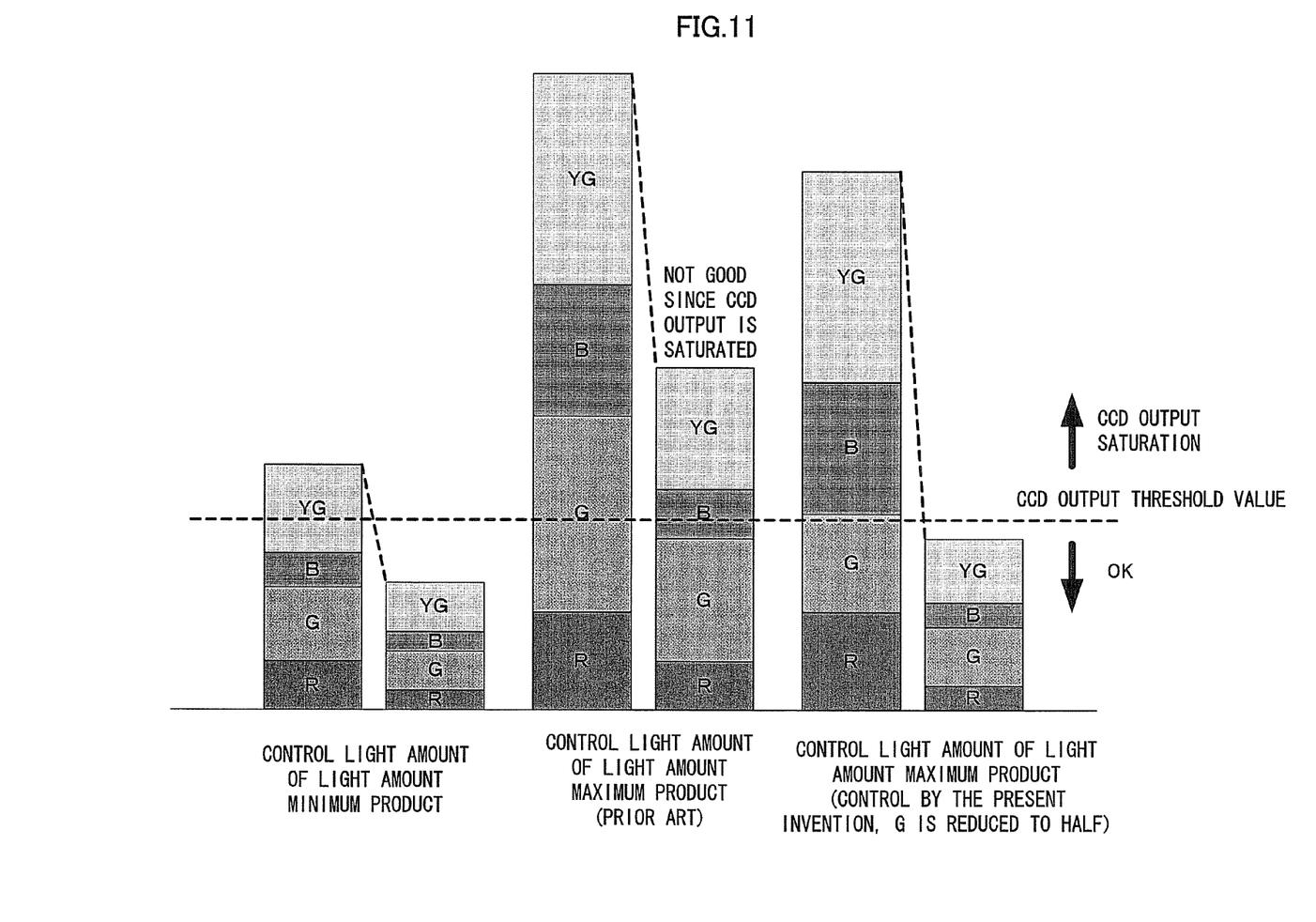
FIG. 11 is a view for explaining an advantageous effect of the present invention.

As shown in FIG. 11, in conventional art, when a light amount is controlled by a light amount maximum product (product which has a maximum value of a light amount in a variation of the light amount), the CCD output has been saturated. However, by using the control of a light amount in the present invention, an appropriate amount of light by which the CCD output is not saturated can be set in either the light amount maximum product and a light amount minimum product (product which has a minimum value of a light amount in a variation of the light amount).

Figure 12:
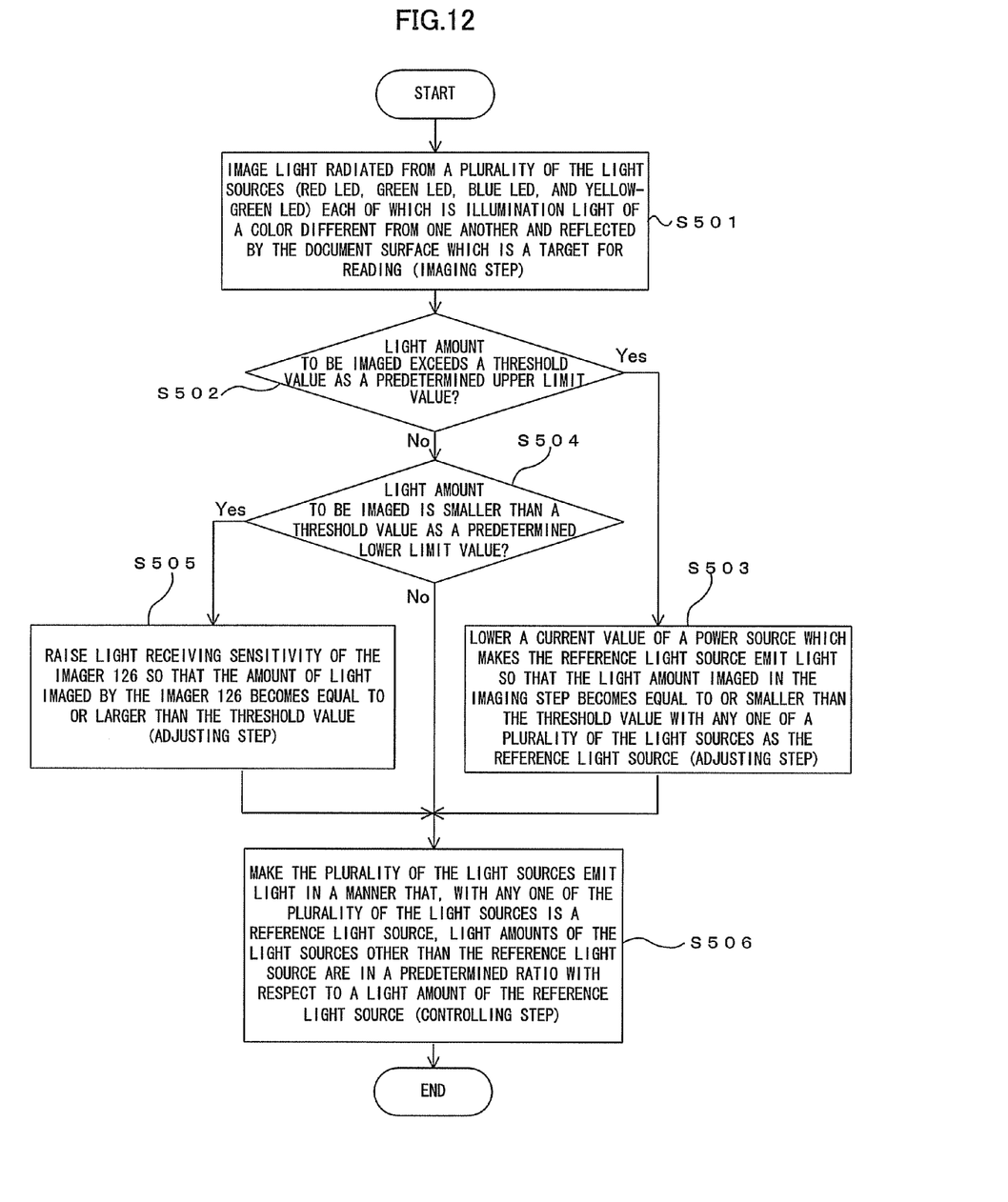
FIG. 12 is a flowchart for explaining a general flow of processing in the image reading device according to the present invention (image reading method).

FIG. 12 is a flowchart for explaining a general flow of processing in the image reading device according to the present embodiment (image reading method).

First, the image pick-up section 126 images light radiated from a plurality of the light sources (red LED, green LED, blue LED, and yellow-green LED) each of which is illumination light of colors different from one another and reflected by the document surface which is a target of reading (imaging step) (S501).

Next, the adjusting unit 102 lowers a current value of a power source which makes the reference light source emit light when an amount of light imaged in the imaging step exceeds a threshold value as a predetermined upper limit value at the time any one of a plurality of the light sources works as the reference light source and only the reference light source illuminates a predetermined reference surface (S502, Yes), so that the amount of light imaged in the imaging step becomes equal to or smaller than the threshold value (adjusting step) (S503). On the other hand, the adjusting unit 102 raises light receiving sensitivity of the image pick-up section 126 when the amount of light imaged in the imaging step is lower than a threshold value as a predetermined lower limit value (S504, Yes), so that the amount of light imaged by the image pick-up section 126 becomes equal to or larger than the threshold value (adjusting step) (S505).

The controlling unit 101 makes the plurality of the light sources emit light in a manner that, with any one of the plurality of the light sources is a reference light source, light amounts of the light sources other than the reference light source are in a predetermined ratio with respect to a light amount of the reference light source (controlling step) (S506).

Each of the steps in the processing in the image reading device described above is achieved by making the CPU 801 execute an image reading program stored in the MEMORY 802.

In the present embodiment, a case in which a function of carrying out the invention is recorded inside the device in advance has been described. The present invention is not limited thereto, and a similar function may be downloaded from a network to the device. Alternatively, a similar function which is stored in a recording medium may be installed to the device. As the recording medium, a form of the recording medium may be any form if the recording medium can store a program and is one from which the device can read, such as a CD-ROM. In addition, a function which is obtained by installing or downloading in advance as described above may work in association with an OS (operating system), etc. inside the device to achieve the function.

As described above, according to the present invention, saturation of the CCD output can be prevented in a case of using an illuminating device having many variations in an amount of light such as an LED as a light source, and a stabilized CCD output can be obtained.

The present invention has been described in detail with a specific embodiment. However, it is obvious to one skilled in the art that a variety of changes and modifications can be made without deviating from the spirit and the scope of the present invention.

What is claimed is:

1. An image reading device comprising:

a plurality of light sources each of which illuminates a document surface as a target for reading with illuminating light of a color different from the other light sources;

an image pick-up section that images light radiated from the plurality of the light sources and reflected on the document surface;

a controlling unit that makes the plurality of the light sources emit light with any one of the plurality of the light sources as a reference light source so that light amounts of the light sources other than the reference light source are in a predetermined ratio with respect to a light amount of the reference light source;

an adjusting unit that lowers a current value of a power source which makes the reference light source emit light when an amount of light imaged in the image pick-up section exceeds a threshold value as a predetermined upper limit value at the time only the reference light source illuminates a predetermined reference surface, so that the amount of light imaged in the image pick-up section is equal to or smaller than the threshold value;

a first illumination unit that has a light transmission tube of a white type including the red LED, the green LED, and the blue LED as the light source, and illuminates the document surface from a direction inclining toward the document surface for a predetermined angle; and a second illumination unit that has an LED array including the yellow-green LED as the light source, and a spectral characteristic different from the first illumination unit, and illuminates the document surface from a direction substantially symmetrical to the first illumination unit with respect to a normal line to the document surface, and the controlling unit controls light emission of the light sources included in the first and the second illumination units.

2. An image reading device comprising:

a plurality of light sources each of which illuminates a document surface as a target for reading with illuminating light of a color different from the other light sources;

an image pick-up section that images light radiated from the plurality of the light sources and reflected on the document surface;

a controlling unit that makes the plurality of the light sources emit light with any one of the plurality of the light sources as a reference light source so that light amounts of the light sources other than the reference light source are in a predetermined ratio with respect to a light amount of the reference light source;

an adjusting unit that lowers a current value of a power source which makes the reference light source emit light when an amount of light imaged in the image pick-up section exceeds a threshold value as a predetermined upper limit value at the time only the reference light source illuminates a predetermined reference surface, so that the amount of light imaged in the image pick-up section is equal to or smaller than the threshold value;

a first illumination unit that has a light transmission tube of a white type including the red LED, the green LED, and the blue LED as the light source, and illuminates the document surface from a direction inclining toward the document surface for a predetermined angle; and a second illumination unit that has an LED array including the yellow-green LED as the light source, and a spectral characteristic different from the first illumination unit, and illuminates the document surface from a direction substantially symmetrical to the first illumination unit with respect to a normal line to the document surface, and the controlling unit controls light emission of the light sources included in the first and the second illumination units, wherein the controlling unit makes the plurality of the light sources emit light so as to obtain a ratio of the light amount of each of the plurality of the light sources as follows:

light amount of red LED:light amount of green LED:light amount of blue LED:light amount of yellow-green LED=0.26:1.0:0.22:1.02.

3. An image reading method in an image reading device that images light radiated from a plurality of light sources, each of which is illuminating light of a color different from the other light sources, and reflected on a document surface as a target for reading, the method comprising:

lowering a current value of a power source that makes the reference light source emit light when an amount of light imaged in the image pick-up section exceeds a threshold value as a predetermined upper limit value at the time any one of the plurality of the light sources works as a reference light source and only the reference light source illuminates a predetermined reference surface, so that the amount of light imaged in the image pick-up section is equal to or smaller than the threshold value; and controlling light emission of the plurality of the light sources so that light amounts of the light sources other than the reference light source are in a predetermined ratio with respect to the light amount of the reference light source, wherein the image reading device comprises a first illumination unit including the red LED, the green LED, and the blue LED that illuminates the document surface from a direction inclining toward the document surface for a predetermined angle, and a second illumination unit that has a spectral characteristic different from the first illumination unit and includes the yellow-green LED for illuminating the document surface from a direction substantially symmetrical to the first illumination unit with respect to a normal line to the document surface, and the plurality of the light sources are each LED in the first and the second illumination units.

4. An image reading method in an image reading device that images light radiated from a plurality of light sources, each of which is illuminating light of a color different from the other light sources, and reflected on a document surface as a target for reading, the method comprising:

lowering a current value of a power source that makes the reference light source emit light when an amount of light imaged in the image pick-up section exceeds a threshold value as a predetermined upper limit value at the time any one of the plurality of the light sources works as a reference light source and only the reference light source illuminates a predetermined reference surface, so that the amount of light imaged in the image pick-up section is equal to or smaller than the threshold value; and controlling light emission of the plurality of the light sources so that light amounts of the light sources other than the reference light source are in a predetermined ratio with respect to the light amount of the reference light source, wherein the image reading device comprises a first illumination unit including the red LED, the green LED, and the blue LED that illuminates the document surface from a direction inclining toward the document surface for a predetermined angle, and a second illumination unit that has a spectral characteristic different from the first illumination unit and includes the yellow-green LED for illuminating the document surface from a direction substantially symmetrical to the first illumination unit with respect to a normal line to the document surface, and the plurality of the light sources are each LED in the first and the second illumination units, wherein the image reading method makes the plurality of the light sources emit light so as to obtain a ratio of the light amount of each of the plurality of the light sources as follows:

light amount of red LED:light amount of green LED:light amount of blue LED:light amount of yellow-green LED=0.26:1.0:0.22:1.02.

* * * * *